United States Patent [19]

Huber

[11] Patent Number: 5,107,360
[45] Date of Patent: Apr. 21, 1992

[54] OPTICAL TRANSMISSION OF RF SUBCARRIERS IN ADJACENT SIGNAL BANDS

[75] Inventor: David R. Huber, Warrington, Pa.

[73] Assignee: General Instrument Corporation, Hatboro, Pa.

[21] Appl. No.: 609,194

[22] Filed: Nov. 5, 1990

[51] Int. Cl.$^5$ ............................................. H04J 14/02
[52] U.S. Cl. .................................... 359/124; 359/181; 358/86
[58] Field of Search ................. 370/3.1; 455/609, 610, 455/612; 358/86; 350/96.16; 359/124, 154, 181

[56] References Cited

U.S. PATENT DOCUMENTS

| | | | |
|---|---|---|---|
| 4,183,054 | 1/1980 | Patisaul et al. | 455/612 |
| 4,891,694 | 1/1990 | Way | 370/3 |
| 4,893,300 | 1/1990 | Carlin et al. | 370/3 |
| 4,976,518 | 12/1990 | Burns | 350/96.16 |
| 5,020,049 | 5/1991 | Bodeep et al. | 359/124 |

FOREIGN PATENT DOCUMENTS

0380945  8/1990  European Pat. Off. ............... 370/3

OTHER PUBLICATIONS

Society of Cable Television Engineers, Fiber Optics Seminar (Jan. 18-20, 1988), pp. 1-6.
A. A. M. Saleh et al., "Nonlinear Distortion Due to Optical Amplifiers in Subcarrier-Multiplexed Lightwave Communications Systems", Electronics Letters, vol. 25, No. 1, pp. 79-80, 1989.
R. Olshansky et al., "Microwave-Multiplexed Wideband Lightwave Systems Using Optical Amplifiers for Subscriber Distribution", Electronics Letters, vol. 24, No. 15, pp. 922-923, 1988.
R. Olshansky et al., "Subcarrier Multiplexed Passive Optical Network for Low-Cost Video Distribution" presented at OFC, 1989.
W. I. Way et al., "Carrier-to-Noise Ratio Performance of a Ninety-Channel FM Video Optical System Employing Subcarrier Multiplexing and Two Cascaded Traveling-Wave Laser Amplifiers", presented at OFC 1989.
J. E. Vandermerwe, "Design of Bipolar Reflective Tapped Optical Fiber Transversal Filter", Electronics Letters, vol. 25, No. 3, pp. 186-188, 1988.
C. E. Lee et al., "Reflectively Tapped Optical Fibre Transversal Filters", Electronics Letters, vol. 23, pp. 596-598, 1987.
K. Sasayana et al., "An Optical Transversal Filter Using Coherent Interference", IOOC-89, pp. 190-191, 1989.
C. T. Chang et al., "Fibre-Optic Delay-Line Devices for R.F. Signal Processing", Electronics Letters, vol. 13, pp. 678-680, 1977.
H. F. Taylor, "Application of Guided Wave Optics in Signal Processing and Sensing", Proc. IEEE, vol. 75, No. 11, pp. 1524-1535, Nov. 1987.

Primary Examiner—Edward L. Coles, Sr.
Assistant Examiner—Kinfe-Michael Negash
Attorney, Agent, or Firm—Barry R. Lipsitz

[57] ABSTRACT

Apparatus is provided for optically transmitting a plurality of AM modulated RF subcarriers in adjacent octaves. A first laser is modulated to produce a first optical output signal containing a plurality of subcarriers in a first octave. A second laser is modulated to produce a second optical output signal containing a plurality of subcarriers in a second octave. The first output signal is optically filtered to attenuate distortion products falling in the second octave. The second output signal is optically filtered to attenuate distortion products falling in the first octave. The filtered first and second output signals are combined for communication over an optical transmission medium. Where the transmission medium is a single mode optical fiber, filtering can be accomplished using single mode transversal filters.

20 Claims, 2 Drawing Sheets

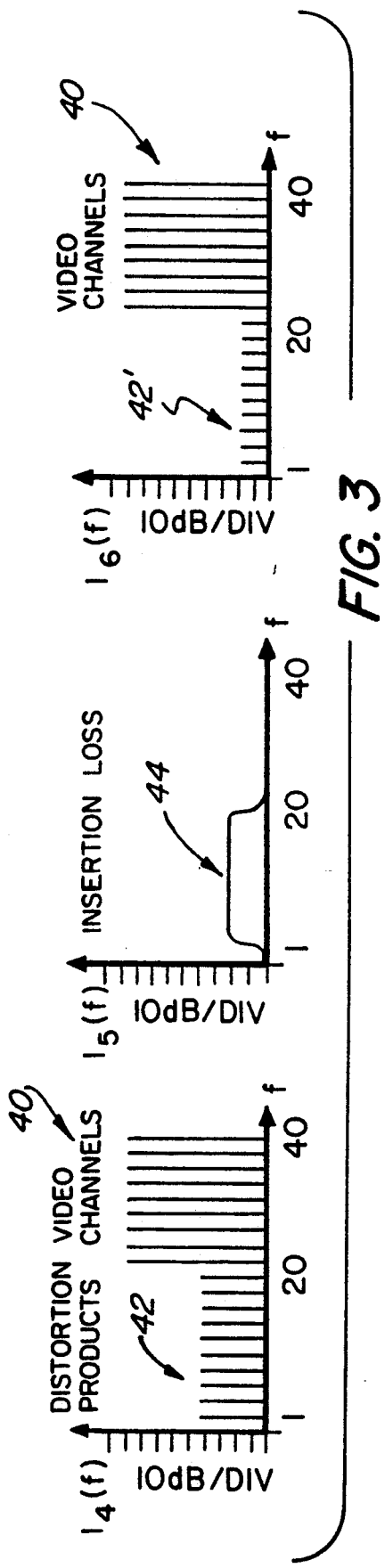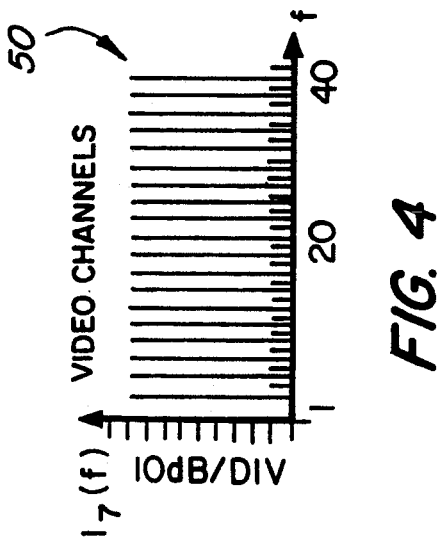

OPTICAL TRANSMISSION OF RF SUBCARRIERS IN ADJACENT SIGNAL BANDS

BACKGROUND OF THE INVENTION

The present invention relates to fiber optic communication systems, and more particularly to apparatus for optically transmitting a plurality of RF subcarriers in adjacent octaves.

Cable television systems currently distribute television program signals via coaxial cable, typically arranged in tree and branch networks. The use of television signals comprising amplitude modulated vestigial-sideband video subcarriers is preferred in the distribution of cable television signals due to the compatibility of that format with National Television Standards Committee ("NTSC") television standards and the ability to provide an increased number of channels within a given bandwidth. An undesirable characteristic of AM-VSB transmission, however, is that it requires a much higher carrier-to-noise ratio ("CNR") than other techniques, such as frequency modulation or digital transmission of video signals. Generally, a CNR of at least 40 dB is necessary to provide clear reception of AM-VSB television signals.

The replacement of coaxial cable with optical fiber transmission lines in television distribution systems has become a high priority. Production single mode fiber can support virtually unlimited bandwidth and has low attenuation. Accordingly, a fiber optic distribution system or a fiber-coax cable hybrid would provide substantially increased performance at a competitive cost as compared to prior art coaxial cable systems.

One problem in implementing an optical fiber distribution system, particularly for AM-VSB signals, is that directly modulated semiconductor lasers of the type typically used in fiber optic systems produce high levels of distortion products (particularly second order) that are not compatible with multi-channel AM-VSB video signals. This is due to the short lifetime of the carrier excited state within the semiconductor laser. A recombination time of such a laser operating near 1.3 $\mu$m or 1.5 $\mu$m is about 1.2 nanoseconds, which is short compared to the period of a typical AM-VSB subcarrier operating in the cable television band of about 55.25 MHz to 1 GHz.

The dependence of second order distortion on carrier lifetime in a semiconductor laser used as an optical amplifier is discussed in A. A. M. Saleh, et al., "Nonlinear Distortion Due to Optical Amplifiers in Subcarrier-Multiplexed Lightwave Communications Systems", *Electronics Letters*, Vol. 25, No. 1, pp. 79-80, 1989. As noted in that article, second order nonlinear distortion is a significant problem in proposed lightwave cable television home distribution systems.

The difficulties presented in transmitting multi-channel AM-VSB television signals over fiber optic distribution systems have led others to propose the use of frequency modulation ("FM") instead of the more desirable AM-VSB format. See, e.g., R. Olshansky, et al., "Microwave-Multiplexed Wideband Lightwave Systems Using Optical Amplifiers for Subscriber Distribution", *Electronics Letters*, Vol. 24, No. 15, pp. 922-923, 1988; R. Olshansky, et al., "Subcarrier Multiplexed Passive Optical Network for Low-Cost Video Distribution", presented at OFC 1989; and W. I. Way, et al., "Carrier-to-Noise Ratio Performance of a Ninety-Channel FM Video Optical System Employing Subcarrier Multiplexing and Two Cascaded Traveling-Wave Laser Amplifiers", presented at OFC 1989. Another proposal has been to convert AM-VSB signals to a digital format for transmission. Digital transmission of AM-VSB television signals over an optical communication link is described in U.S. Pat. No. 4,183,054 to Patisaul, et al., entitled "Digital, Frequency-Translated, Plural-Channel, Vestigial Sideband Television Communication System".

It would be advantageous to provide an optical fiber based cable television distribution system that utilizes the AM subcarrier modulation format and frequency plan utilized by current coaxial cable distribution systems. Such a fiber based system would provide compatibility with existing coaxial systems, and enable an orderly progression from current coaxial systems to hybrid coaxial/fiber systems, and ultimately to all fiber distribution systems.

The present invention provides optical fiber based distribution apparatus for AM subcarriers that enjoys the aforementioned advantages and overcomes the problem of second order distortion products generated by directly modulated semiconductor lasers.

SUMMARY OF THE INVENTION

In accordance with the present invention, apparatus is provided for optically transmitting subcarriers in adjacent signal bands (e.g., octaves). A first laser operates at a first wavelength, and is modulated with a first subcarrier to provide a first optical output signal. A second laser operating at a second wavelength is modulated with a second subcarrier to provide a second optical output signal. Means are provided for optically filtering the first output signal to attenuate distortion products falling within a frequency band containing the second subcarrier. Similarly, means are provided for optically filtering the second output signal to attenuate distortion products falling within a frequency band containing the first subcarrier. The filtered first and second output signals are combined for communication over an optical transmission medium.

The first and second subcarriers may be AM modulated RF subcarriers. The lasers may be semiconductor lasers, that are directly modulated with the first and second subcarriers, respectively. In a cable television application, the subcarriers contain video information.

In a preferred embodiment of the present invention, the optical transmission medium is a single mode optical fiber. The filtering means can comprise single mode transversal filters, although other types of optical filters may also be used.

The wavelengths of the first and second lasers are selected to preclude the generation of beat frequencies within a predetermined band containing the subcarriers. Where the first and second subcarriers comprise AM modulated cable television channel signals, the predetermined band in which beat frequencies are avoided will generally comprise the entire cable television spectrum.

Each laser may be modulated with a plurality of cable television channel subcarriers to provide modulated channel signals in adjacent octaves. A plurality of additional lasers may be provided, each operating at a unique wavelength for use in communicating additional channel signals in corresponding octaves. An optical filter is provided for each additional laser to attenuate distortion products falling in adjacent octaves.

BRIEF DESCRIPTION OF THE DRAWINGS

FIG. 3 illustrates frequency spectra and a filter response curve for a second path of the apparatus of FIG. 1; and FIG. 4 illustrates the combined frequency spectra for communication over an optical transmission medium.

DETAILED DESCRIPTION OF THE INVENTION

The present invention provides an optical scheme for transmitting subcarriers in adjacent signal bands. In the embodiment disclosed herein, two or more RF octaves of AM subcarrier multiplexed television channels are combined for communication over an optical fiber.

Figure 1:
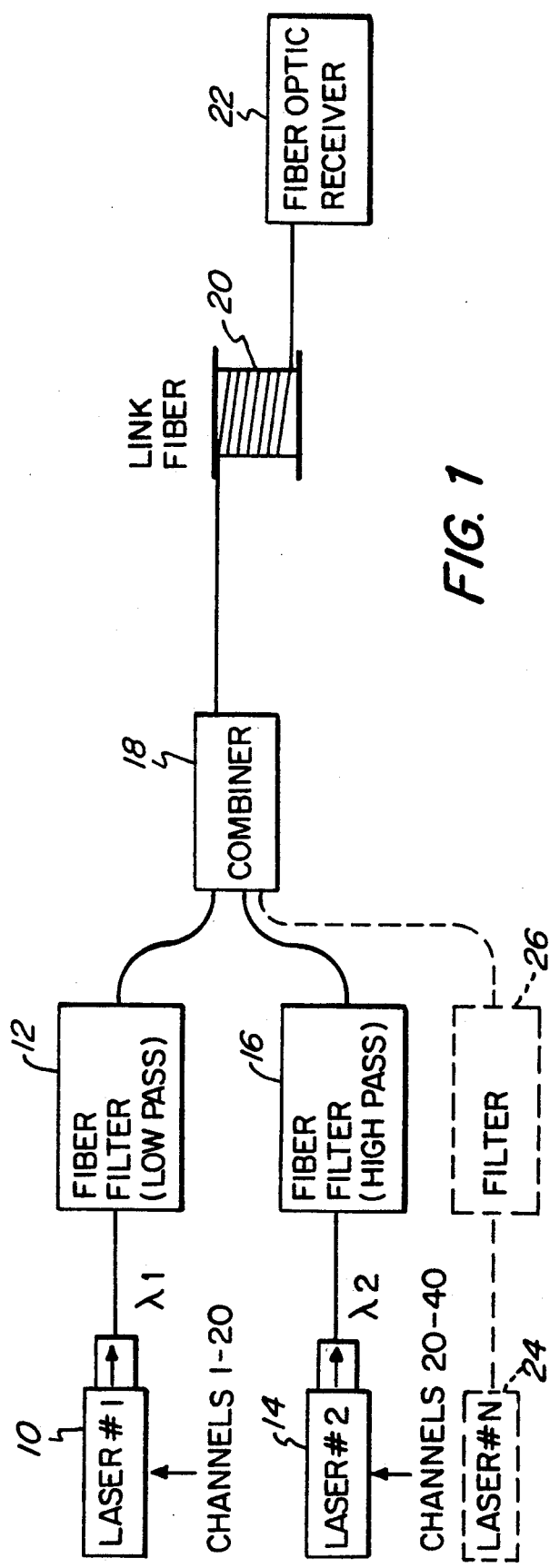
FIG. 1 is a block diagram illustrating apparatus in accordance with the present invention.
Figure 2:
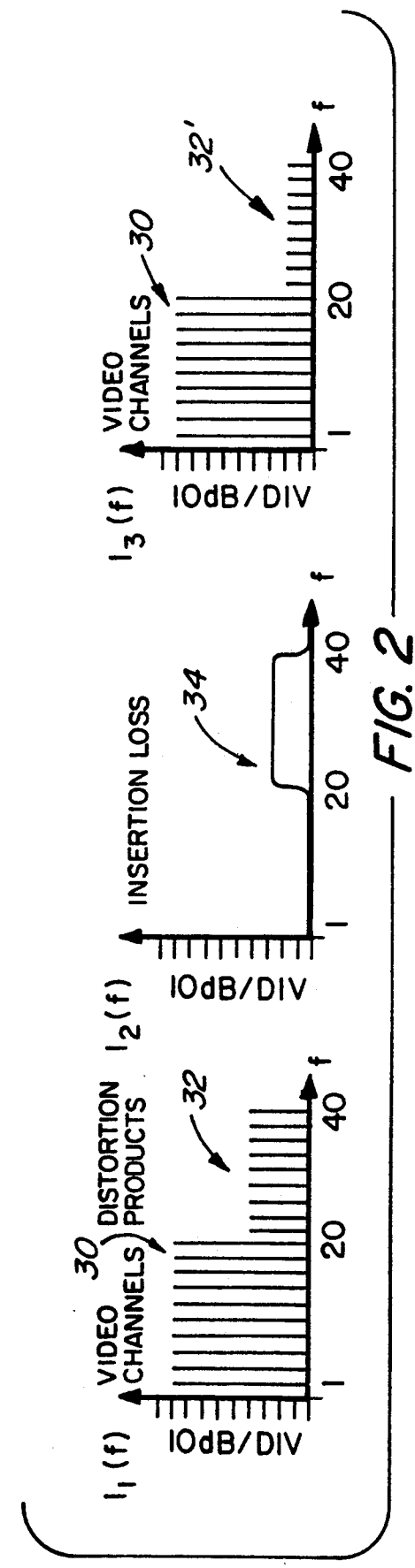
FIG. 2 depicts frequency spectra and a filter response curve for a first path of the apparatus of FIG. 1.

Apparatus in accordance with the present invention is illustrated in FIG. 1. A first laser 10 operating at a wavelength $\lambda_1$ is directly modulated with television channel signals (e.g., channels 1-20) contained in a first frequency band ("octave"). Laser 10 produces a first optical output signal having a frequency spectrum containing video channels 30 and second order distortion products 32 as illustrated in FIG. 2. The second order distortion products 32 from the first octave (channels 1-20) fall in an adjacent second octave (channels 21-40) as shown.

The apparatus of FIG. 1 also contains a second semiconductor laser 14 operating at a wavelength $\lambda_2$, that is modulated by a plurality of subcarrier channels 21-40 contained in the second octave. Laser 14 provides a second optical output signal containing video channels 40 and second order distortion products 42 as shown in FIG. 3. As indicated, the second order distortion products generated by laser 14 fall in the first octave (containing video channels 1-20) output from laser 10. A comparison of the laser output frequency spectra of FIGS. 2 and 3 indicates that the second order distortion products 32 from laser 10 overlap the desired video channels 40 from laser 14, and the second order distortion products 42 from laser 14 overlap the desired video channels 30 output from laser 10. The second order distortion products from the respective lasers are so large as to render the octaves in which they fall useless for transmission of video channels. One solution to this problem would be to transmit channels 1-20 only, but this would waste the bandwidth of the second octave.

In accordance with the present invention, the RF spectral distortion products that fall in the adjacent octaves are optically attenuated. A low pass fiber filter 12, having an insertion loss 34 illustrated in FIG. 2, is provided to filter the frequency spectrum output from laser 10. The resulting frequency spectrum, shown in FIG. 2, includes the unfiltered desired video channels 30 and attenuated filtered distortion products 32'.

A high pass fiber filter 16 having an insertion loss 44 as illustrated in FIG. 3 is coupled to the output of laser 14. The resultant frequency spectrum includes the desired unfiltered video channels 40 and the attenuated filtered distortion products 42', as shown in FIG. 3.

Outputs from filters 12 and 16 are combined in an optical combiner 18 to provide a frequency spectrum 50 as illustrated in FIG. 4. This resultant signal is transmitted over an optical fiber 20 to a fiber optic receiver 22. The combined frequency spectrum 50 contains the video channels 30 from the first octave and video channels 40 from the second octave, together with attenuated distortion components 32', 42' which have been reduced to such an extent that they will not interfere with the communication of the desired channels in both adjacent octaves.

The wavelengths $\lambda_1$ and $\lambda_2$ of lasers 10, 14 respectively are selected such that the RF beat frequency of the two lasers falls outside the frequency spectrum (e.g., cable television spectrum) in which the signals are communicated. One or more other lasers 24, each operating at a unique wavelength, and corresponding filters 26 can be added to accommodate channel signals in additional octaves.

Filters 12, 16, and 26 can comprise any of the various known optical filters for filtering optically modulated RF subcarrier signals. In a preferred embodiment, transmission fiber 20 is a single mode optical fiber and the filters are single mode transversal devices. Examples of such filters are provided in J. E. Vandermerwe, "Design of Bipolar Reflective Tapped Optical Fiber Transversal Filter", *Electronics Letters*. Vol. 25, No. 3, pp. 186-188, 1988; C. E. Lee, et al, "Reflectively Tapped Optical Fibre Transversal Filters", *Electron. Lett.*, Vol. 23, pp. 596-598, 1987; and K. Sasayana, et al, "An Optical Transversal Filter Using Coherent Interference", *IOOC*-89, pp. 190-191, 1989. The reference by Sasayama discloses a single mode transversal filter realized on a silica substrate, that can be used in accordance with the present invention for video distribution based on single mode fiber.

Alternately, a bandpass filter can be constructed using delay lines, as set forth in C. T. Chang, et al, "Fibre-Optic Delay-Line Devices for R. F. Signal Processing", *Electron. Lett.*, Vol. 13, pp. 678-680, 1977. A general discussion of optical signal processing that mentions optical filter design is provided in H. F. Taylor, "Application of Guided Wave Optics in Signal Processing and Sensing", *Proc. IEEE*, Vol. 75, No. 11, pp. 1524-1535, Nov. 1987.

Optical combiner 18 can comprise a wave division multiplex combiner or other device well known in the art. If the system can withstand the loss, a wavelength insensitive 3 dB coupler can be used to combine the output signals from the filters. If a low loss combiner is needed, and the wavelengths output from the lasers are sufficiently far apart, a wavelength selective dichroic type coupler can be used. Alternately, an unbalanced Mach-Zehnder interferometer etched in silica can be used to allow frequency selective multiplexing of multiple optical frequencies.

It should now be appreciated that the present invention provides for the transmission of two or more adjacent octaves of AM modulated video information over an optical communication path. A plurality of lasers, each modulated with subcarriers contained in a corresponding octave, are used to produce optical output signals. The optical output signals are processed to attenuate distortion products that would interfere with adjacent octaves, and are then combined to produce a multi-octave signal for transmission.

Although the invention has been described in connection with a preferred embodiment thereof, it will be appreciated by those skilled in the art that numerous modifications and adaptations may be made thereto without departing from the spirit and scope of the invention, as set forth in the following claims.

What is claimed is:

1. Apparatus for optically transmitting subcarriers in adjacent signal bands comprising:
   a first laser operating at a first wavelength to provide a first optical carrier;
   means for modulating said first optical carrier with a first subcarrier to provide a first optical output signal for transmission;
   a second laser operating at a second wavelength to provide a second optical carrier;
   means for modulating said second optical carrier with a second subcarrier to provide a second optical output signal for transmission;
   means for optically filtering said first output signal prior to transmission to attenuate distortion products falling within a radio frequency band containing said second subcarrier;
   means for optically filtering said second output signal prior to transmission to attenuate distortion products falling within a radio frequency band containing said first subcarrier; and
   means for combining the filtered first and second output signals for communication over an optical transmission medium.

2. Apparatus in accordance with claim 1 wherein said first and second subcarriers are RF subcarriers.

3. Apparatus in accordance with claim 2 wherein said first and second RF subcarriers are AM modulated.

4. Apparatus in accordance with claim 1 wherein said lasers are semiconductor lasers.

5. Apparatus in accordance with claim 4 wherein said first and second lasers are directly modulated with the first and second subcarriers, respectively, to produce the first and second optical output signals.

6. Apparatus in accordance with claim 5 wherein said first and second subcarriers are AM modulated RF subcarriers.

7. Apparatus in accordance with claim 6 wherein said subcarriers contain video information.

8. Apparatus in accordance with claim 1 wherein said optical transmission medium is a single mode optical fiber.

9. Apparatus in accordance with claim 8 wherein said filtering means comprise single mode transversal filters.

10. Apparatus in accordance with claim 1 wherein said first and second laser wavelengths are selected to preclude the generation of beat frequencies within a predetermined band containing said subcarriers.

11. Apparatus in accordance with claim 10 wherein said first and second subcarriers comprise AM modulated cable television channel signals and said predetermined band is the cable television spectrum.

12. Apparatus in accordance with claim 1 wherein:
   said first optical carrier modulating means modulate the first optical carrier with a plurality of cable television channel subcarriers in a first frequency band;
   said second optical carrier modulating means modulate the second optical carrier with a plurality of cable television channel subcarriers in a second frequency band adjacent to said first frequency band; and
   said optical filtering means attenuate distortion products in the first and second optical output signals falling in the second and first frequency bands, respectively.

13. Apparatus for optically transmitting a plurality of AM modulated RF subcarriers in adjacent octaves comprising:
   a first laser operating at a first wavelength to provide a first optical carrier;
   a second laser operating at a second wavelength to provide a second optical carrier;
   means for modulating said first optical carrier to produce a first optical output signal for transmission containing a plurality of AM modulated RF subcarriers in a first octave;
   means for modulating said second optical carrier to produce a second optical output signal for transmission containing a plurality of AM modulated RF subcarriers in a second octave;
   means for optically filtering said first output signal prior to transmission to attenuate distortion products falling in said second octave;
   means for optically filtering said second output signal prior to transmission to attenuate distortion products falling in said first octave; and
   means for combining the filtered first and second output signals for communication over an optical transmission medium.

14. Apparatus in accordance with claim 13 wherein said first and second laser wavelengths are selected to preclude the generation of beat frequencies within a predetermined frequency spectrum containing said first and second octaves.

15. Apparatus in accordance with claim 14 wherein said subcarriers comprise cable television signals and said predetermined spectrum is the cable television spectrum.

16. Apparatus in accordance with claim 13 wherein said optical transmission medium is a single mode optical fiber.

17. Apparatus in accordance with claim 16 wherein said filtering means comprise single mode transversal filters.

18. Apparatus in accordance with claim 13 wherein said lasers are semiconductor lasers.

19. Apparatus in accordance with claim 18 wherein said lasers are directly modulated by said modulating means to produce said optical output signals.

20. Apparatus in accordance with claim 13 further comprising:
   a plurality of additional lasers each operating at a unique wavelength;
   means for modulating each additional laser to produce a corresponding output signal containing a plurality of AM modulated RF subcarriers in a corresponding octave;
   means for optically filtering the output signal of each additional laser to attenuate distortion products falling in adjacent octaves; and
   means for combining the output signals of said additional lasers with said first and second output signals for communication over said optical transmission medium.

* * * * *